US012566326B2

(12) United States Patent
Ready et al.

(10) Patent No.: US 12,566,326 B2
(45) Date of Patent: Mar. 3, 2026

(54) DUAL PATH WIDE FIELD OF REGARD OPTICAL STEERING SYSTEM

(71) Applicant: RAYTHEON COMPANY, Waltham, MA (US)

(72) Inventors: Richard Ready, Frisco, TX (US); Chris Shreve, Celina, TX (US); Sean G. Thomas, McKinney, TX (US)

(73) Assignee: Raytheon Company, Arlington, VA (US)

( * ) Notice: Subject to any disclaimer, the term of this patent is extended or adjusted under 35 U.S.C. 154(b) by 573 days.

(21) Appl. No.: 18/094,607

(22) Filed: Jan. 9, 2023

(65) Prior Publication Data

US 2024/0231075 A1 Jul. 11, 2024

(51) Int. Cl.
G02B 26/08 (2006.01)
G02B 7/182 (2021.01)

(52) U.S. Cl.
CPC ....... *G02B 26/0816* (2013.01); *G02B 7/1821* (2013.01)

(58) Field of Classification Search
CPC ........................... G02B 26/0816; G02B 7/1821
See application file for complete search history.

(56) References Cited

FOREIGN PATENT DOCUMENTS

CN 110324571 A * 10/2019 ............. H04N 23/55

OTHER PUBLICATIONS

CN-110324571-A, translation (Year: 2019).*

* cited by examiner

*Primary Examiner* — Wen Huang

(57) ABSTRACT

An optical assembly includes a primary mirror, a secondary mirror, and an optical steering system configured to support and position the primary mirror and the secondary mirror. The optical steering system includes a base and a yoke rotatably coupled to the base. The yoke is configured to support the primary mirror to rotate the primary mirror about a first axis and to support a secondary mirror to rotate the secondary mirror about a second axis. The yoke further is configured to rotate the primary and secondary mirror about a third axis. The secondary mirror is configured to move from a stowed position in which the optical assembly is positioned to receive an image from a field of view to a deployed position in which the optical assembly is positioned to receive an image from a field of regard.

20 Claims, 9 Drawing Sheets

Yaw

Pitch

DUAL PATH WIDE FIELD OF REGARD OPTICAL STEERING SYSTEM

GOVERNMENT RIGHTS

This invention was made with U.S. government support under Government Contract. The U.S. government has certain rights in this invention.

BACKGROUND OF THE INVENTION

Embodiments of the present disclosure relate to a steering system, and more particularly to a dual path wide field of regard optical steering system. Such fast steering systems may be deployed in a sensor or video system associated with a vehicle, a vessel or an aircraft, for example.

Steering systems are known, and provide the backbone of some conventional sensors and/or video systems. Improving field of regard, sometimes referred to as "FOR," is desired for systems that are both mounted behind a fixed outer mold line and use agile aperture. There are at least two challenges for these systems employing current approaches. One challenge is that current agile steering mechanisms are relatively large, and consume valuable space within a window assembly and sweep out a large volume during movement. Another challenge is that in greenhouse window assemblies, which must fully surround the mechanism, the steering mechanisms are prohibitively large and expensive and require actuators.

Turreted approaches in which the entire optical assembly is moved with the field of view lack the agility desired. Some systems lack the required field of regard viewing area, whereas some other designs confirm the required field of regard and agility, but require larger volumes and window assemblies, or require actuated window assemblies, which do not meet present requirements. Such systems fail to address the issues described above.

SUMMARY OF INVENTION

One aspect of the present disclosure is directed to an optical assembly comprising a primary mirror, a secondary mirror, and an optical steering system configured to support and position the primary mirror and the secondary mirror. The optical steering system includes a base and a yoke rotatably coupled to the base. The yoke is configured to support the primary mirror to rotate the primary mirror about a first axis and to support a secondary mirror to rotate the secondary mirror about a second axis, which is parallel to the first axis. The yoke further is configured to rotate the primary and secondary mirror about a third axis, which is perpendicular to the first axis and the second axis. The secondary mirror is configured to move from a stowed position in which the optical assembly is positioned to receive an image from a field of view to a deployed position in which the optical assembly is positioned to receive an image from a field of regard.

Embodiments of the optical assembly further may include the yoke having a first movement mechanism configured to rotate the primary mirror about the first axis. The first movement mechanism may include a connector element provided on one side of the primary mirror and a motor provided on the opposite side of the primary mirror to rotate the primary mirror about the first axis. The yoke may include a second movement mechanism configured to rotate the yoke and the primary mirror about the second axis. The second movement mechanism may include a base configured to rotatably support the yoke and to rotate the yoke and the primary mirror about the second axis. The yoke further may include a third movement mechanism configured to rotate the secondary mirror about the third axis. The third movement mechanism may include a connector element provided on one side of the secondary mirror and a stator of a motor provided on an opposite side of the secondary mirror to rotate the secondary mirror about the third axis. The third axis may be parallel to the first axis and the second axis may be generally perpendicular to first axis and the third axis. The secondary mirror may be mounted on a first extended portion of the yoke. The yoke may include a second extended portion having a counterweight, with the second extended portion extending in a direction opposite to a direction of the first extended portion. The turret may include an optical window through which the optical path travels.

Another aspect of the present disclosure is directed to an optical steering system configured to support and position a primary mirror and a secondary mirror of an optical assembly. In one embodiment, the optical steering system comprises a base and a yoke rotatably coupled to the base. The yoke is configured to support the primary mirror to rotate the primary mirror about a first axis and to support a secondary mirror to rotate the secondary mirror about a second axis, which is parallel to the first axis. The yoke further is configured to rotate the primary and secondary mirror about a third axis, which is perpendicular to the first axis and the second axis. The secondary mirror is configured to move from a stowed position in which the optical assembly is positioned to receive an image from a field of view to a deployed position in which the optical assembly is positioned to receive an image from a field of regard.

Embodiments of the optical steering system further may include the yoke having a first movement mechanism configured to rotate the primary mirror about the first axis. The first movement mechanism may include a connector element provided on one side of the primary mirror and a motor provided on the opposite side of the primary mirror to rotate the primary mirror about the first axis. The yoke may include a second movement mechanism configured to rotate the yoke and the primary mirror about the second axis. The second movement mechanism may include a base configured to rotatably support the yoke and to rotate the yoke and the primary mirror about the second axis. The yoke further may include a third movement mechanism configured to rotate the secondary mirror about the third axis. The third movement mechanism may include a connector element provided on one side of the secondary mirror and a stator of a motor provided on an opposite side of the secondary mirror to rotate the secondary mirror about the third axis. The secondary mirror may be mounted on a first extended portion of the yoke. The yoke may include a second extended portion having a counterweight, with the second extended portion extending in a direction opposite to a direction of the first extended portion.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence is intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION OF THE INVENTION

Embodiments of the present disclosure are directed to employing a secondary mirror into the optical path that is used to extend the field of regard and relocate the "eyepoint" of a sensor. Multiple methods of placing the secondary mirror into the path can be used such that the secondary mirror can be removed when extended field of regard is not required. For example, one method may include attaching the secondary mirror to an azimuth base, which is disclosed herein. Because an exit pupil will remain on the primary steering mirror, the secondary mirror can be larger or the overall entrance aperture can be reduced. When at steep elevation angles, a full aperture is not required to meet mission needs.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 1:
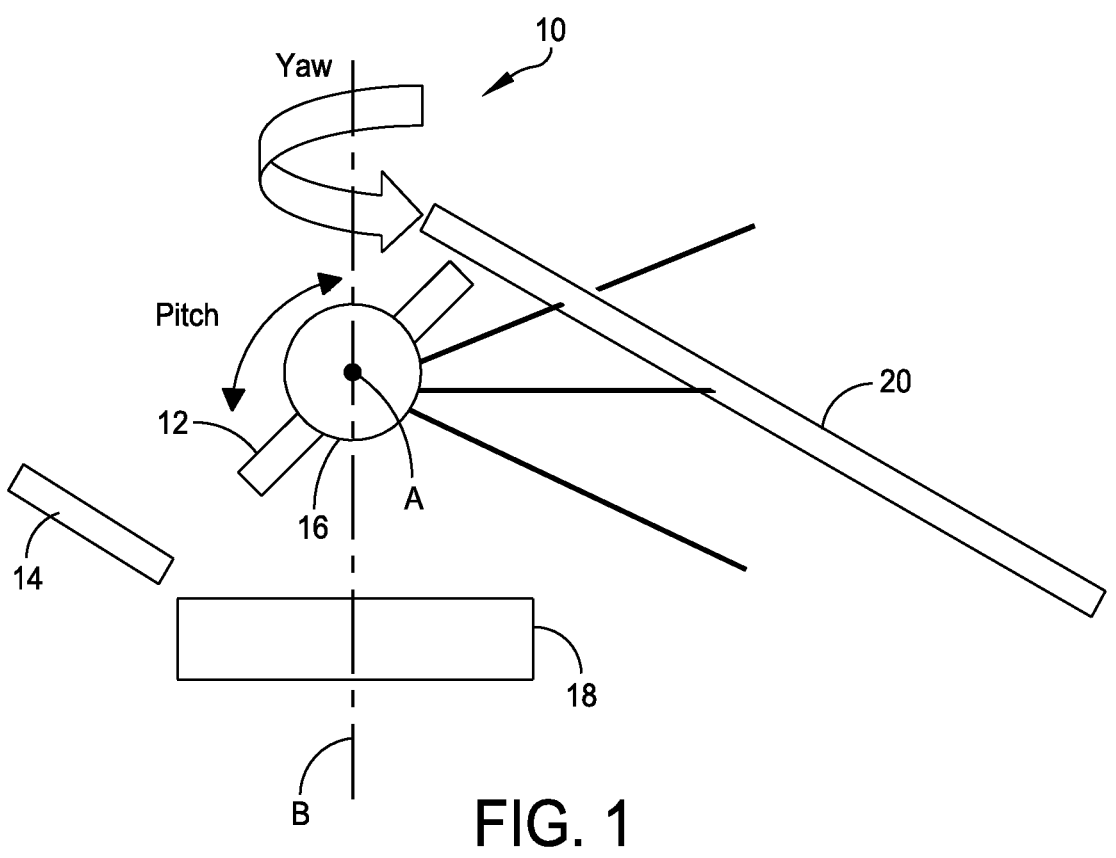
FIG. 1 is a schematic view of an optical assembly including a dual path wide field of regard optical steering system of an embodiment of the present disclosure with a secondary mirror in a stowed position.
Figure 2:
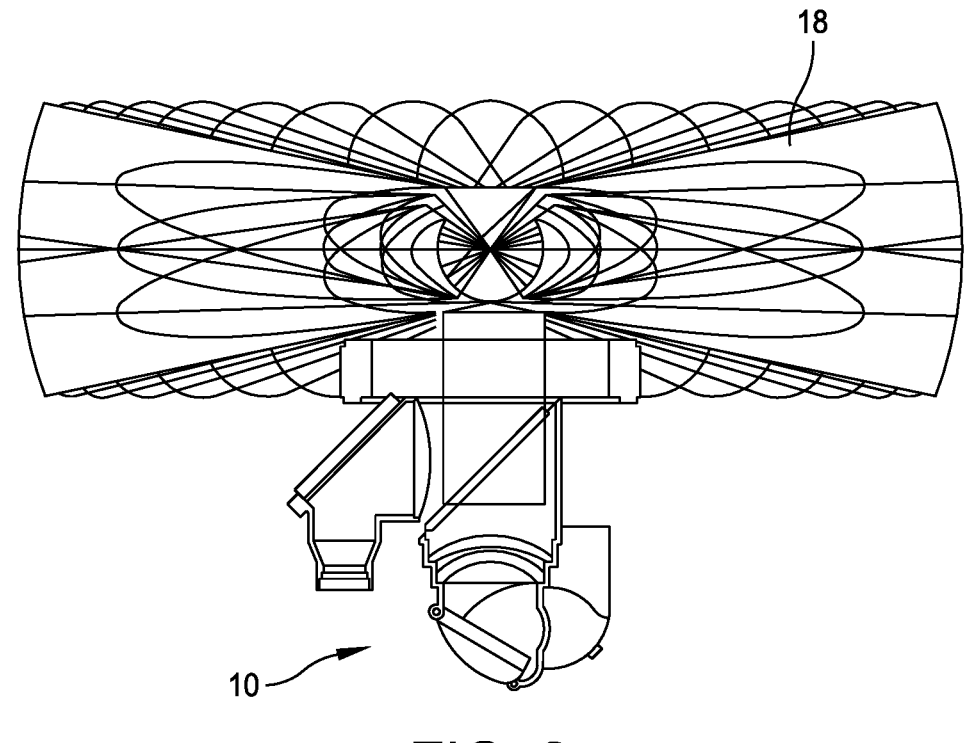
FIG. 2 is a view showing field of view of the optical assembly shown in FIG. 1.

Referring to the drawings, and more particularly to FIGS. 1 and 2, an optical assembly is generally indicated at 10. The optical assembly 10 includes a primary mirror 12 and a secondary mirror 14, which is configured to rotate about the primary mirror. The optical assembly 10 further includes an optical steering system configured to move the primary mirror 12 and the secondary mirror 14. The optical steering system includes a first movement mechanism having a first motor 16 configured to rotate the primary mirror 12 about axis A (pitch). The movement optical steering system further includes a second movement mechanism having a second motor 18 configured to rotate the primary mirror 12 about axis B (yaw). The first and second movement mechanisms of the optical steering system are configured to position the primary mirror 12 to receive and image from a field of view through a fixed window 20.

As mentioned above, the optical assembly 10 includes the secondary mirror 14, which is configured to rotate about the primary mirror. FIG. 1 illustrates the secondary mirror 14 in a stowed position. The secondary mirror 14 is moved into an optical path that is used to extend the elevation field of regard and relocate an eyepoint of the optical assembly 10. In one embodiment, the second movement mechanism is configured to move the secondary mirror 14 from the stowed position to a deployed position. Because an exit pupil will remain on the primary mirror 12, the secondary mirror 14 will be larger, or the overall entrance aperture will be reduced. When at steeper elevation angles, full apertures are not required. FIG. 2 illustrates a field of view 22 of the optical steering system shown in FIG. 1.

Figure 3:
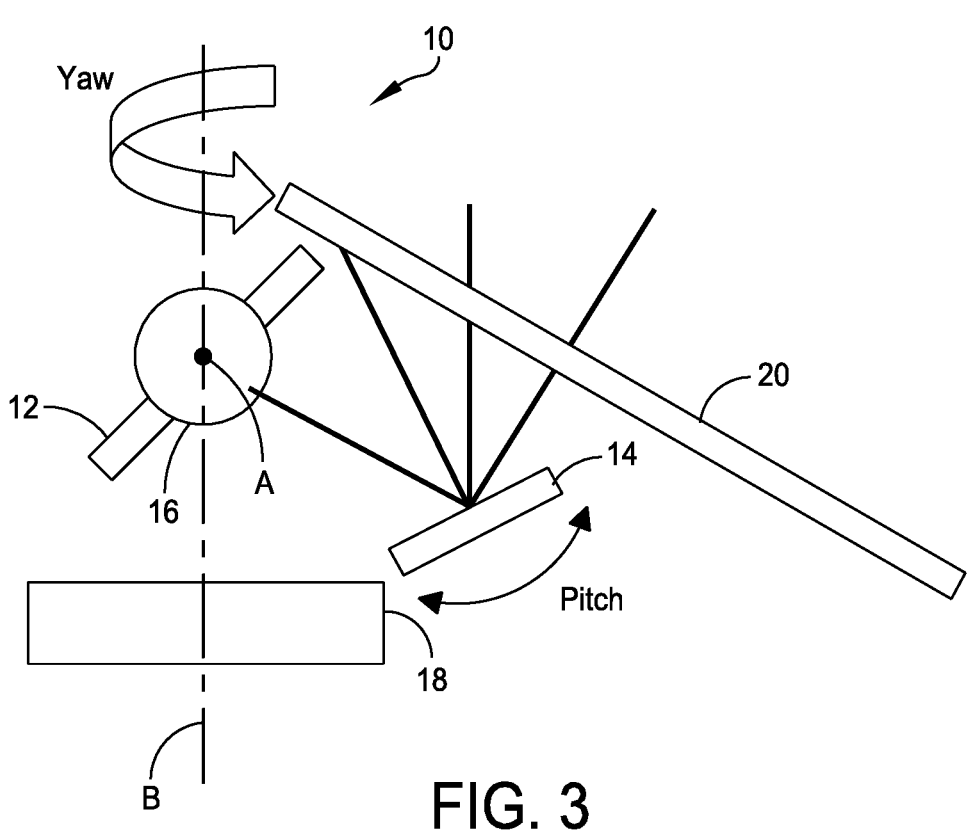
FIG. 3 is a schematic view of the optical assembly with the secondary mirror in of the optical steering system a deployed position.
Figure 4A:
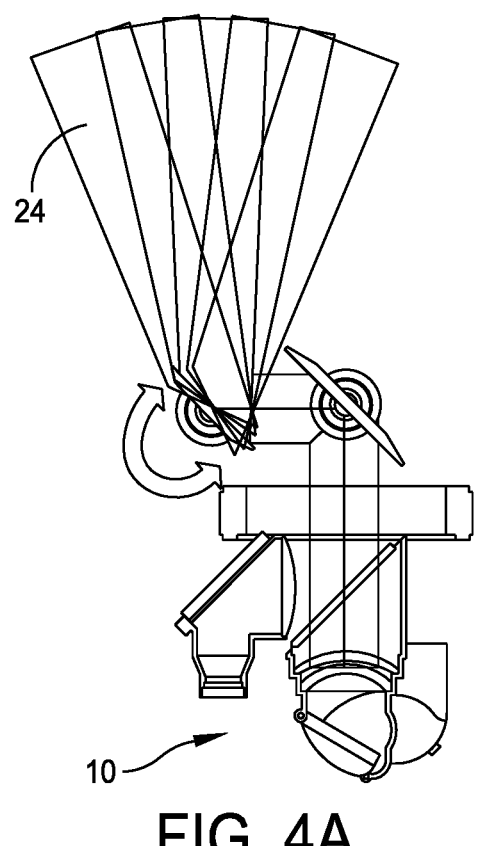
FIGS. 4A and 4B are views showing a field of regard of the optical assembly shown in FIG. 3.
Figure 4B:
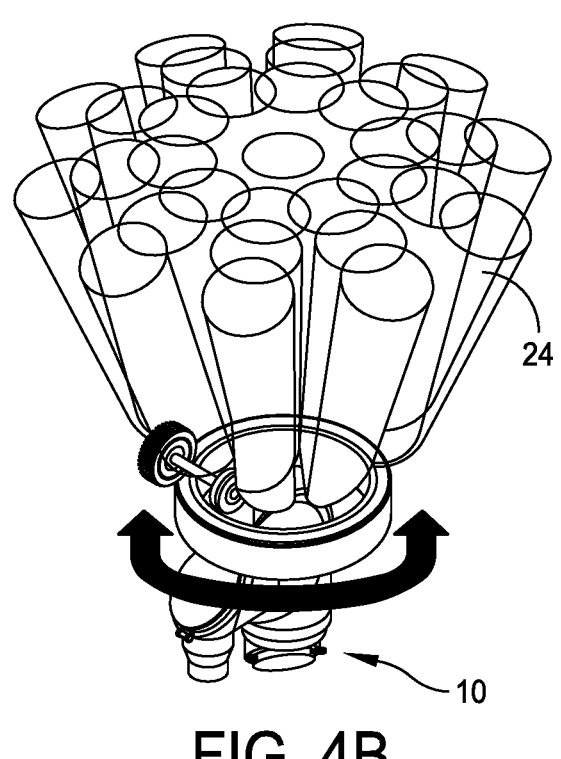

Referring to FIG. 3, the secondary mirror 14 is moved to a deployed position. As shown, the secondary mirror 14 is rotated about the primary mirror 12 to receive an image from the primary mirror thereby increasing a field of regard of the optical assembly 10. As will be described in greater detail below, the mechanism employed to move the secondary mirror 14 between the stowed and deployed positions may include any number of designs, including mounting the secondary mirror on second movement mechanism. FIGS. 4A and 4B illustrate a field of regard of the optical steering system shown in FIG. 3.

Figure 5:
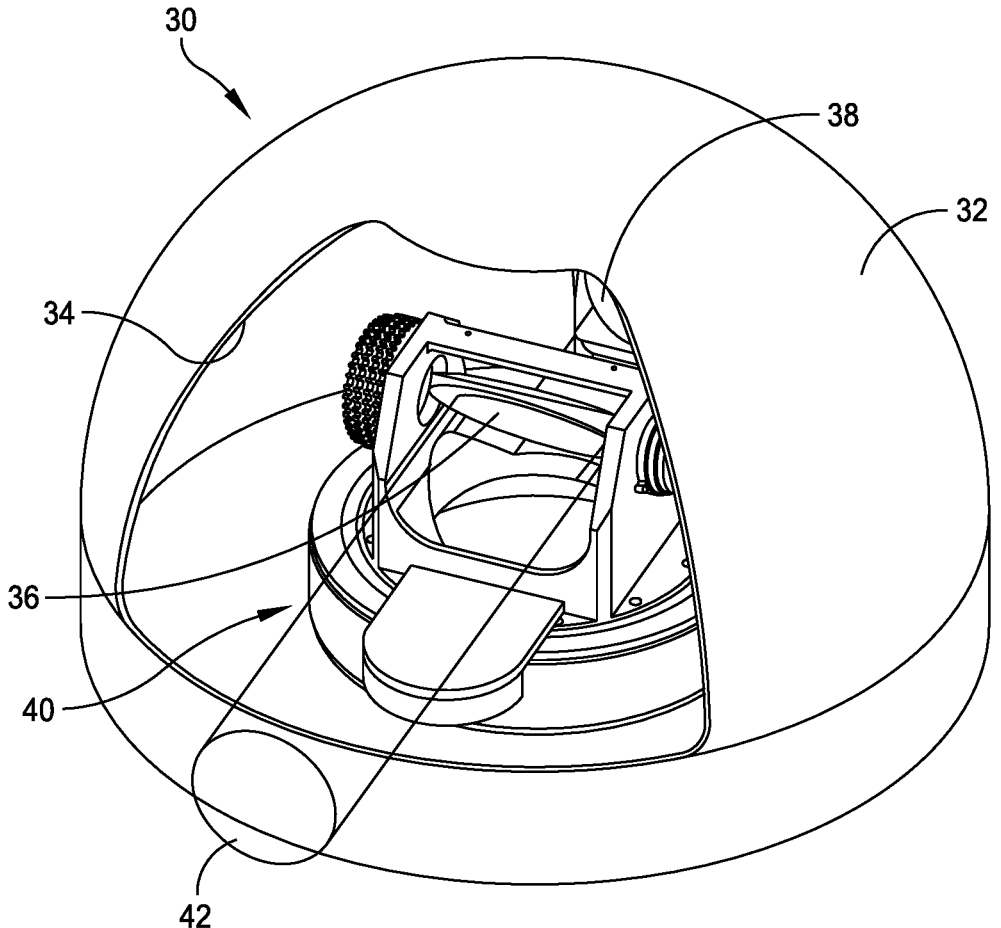
FIG. 5 is a perspective view of an optical assembly including a dual path wide field of regard optical steering system of another embodiment of the present disclosure with a secondary mirror in a stowed position.

Referring to FIG. 5, an optical assembly of an embodiment of the present disclosure is generally indicated at 30. As shown, the optical assembly 30 includes a turret 32 having an optical window 34. The turret 32 is provided to protect the operating components of the optical assembly 10. The optical assembly 30 further includes a primary mirror 36 and a secondary mirror 38 (FIG. 6), which are enclosed by the turret 32. The optical assembly 30 further includes a dual path wide field of regard optical steering system, which is generally indicated at 40. The optical steering system 40 is configured to position the primary mirror 36 to detect an image along an optical path indicated at 42 in FIG. 5, and to transmit the image to a sensor or detector. As will be described in greater detail below, the optical assembly 30 is configured to detect an image along a field of view and a wider field of regard.

Figure 6:
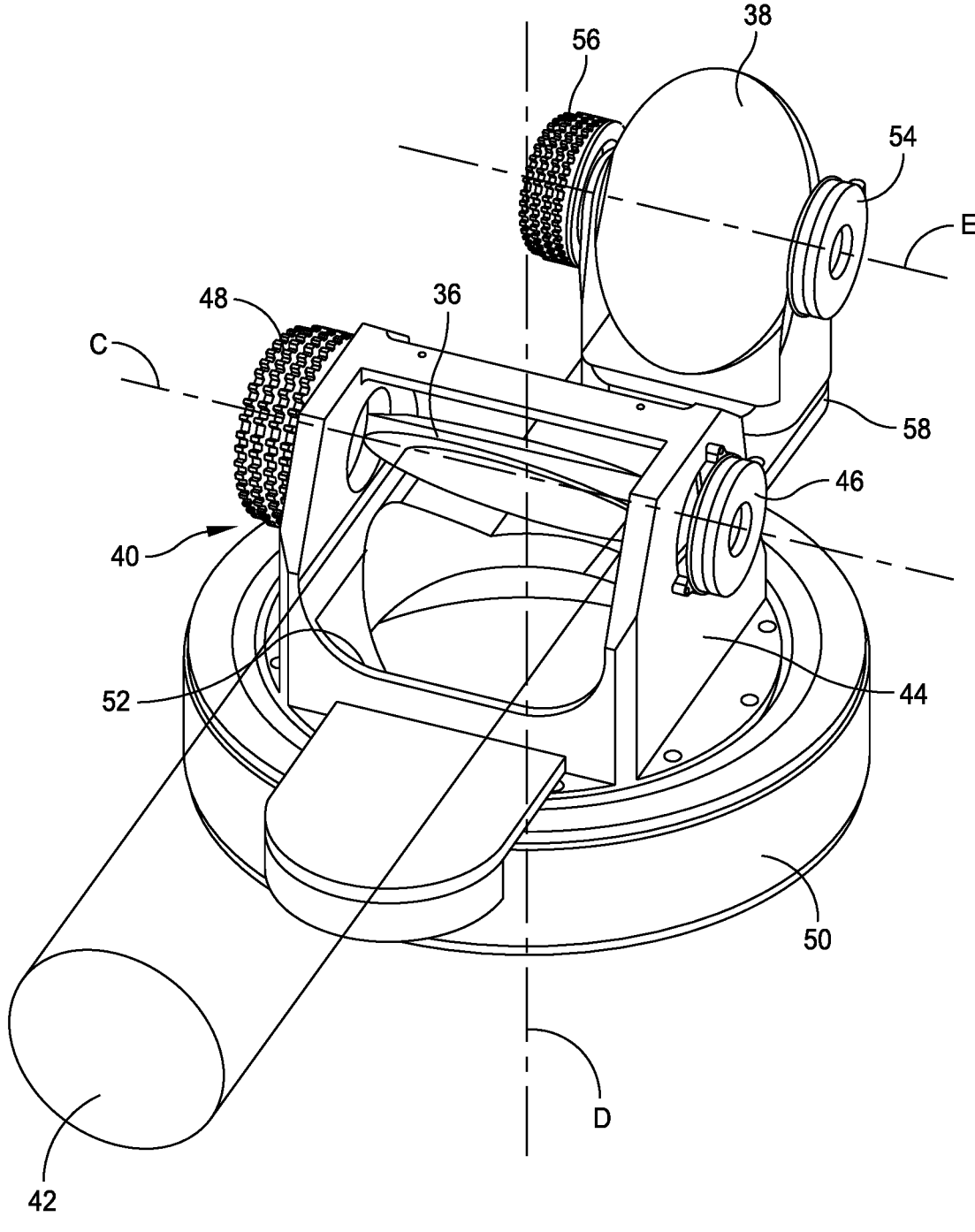
FIG. 6 is a perspective view of the optical assembly shown in FIG. 5 with a turret removed to show the operational components of the optical steering system.

Referring to FIG. 6, the optical steering system 40 is configured to position the primary mirror 36 to receive an image along the optical path 42. The optical steering system 40 includes a first movement mechanism including a yoke 44 configured to secure the primary mirror 36 along an axis C. The yoke 44 includes a connector element 46 provided on one side of the primary mirror 36 and a stator 48 of a motor provided on an opposite side of the primary mirror to rotate the primary mirror about axis C. The first movement mechanism is configured to rotate the primary mirror 36 about axis C to change pitch of the primary mirror. The optical steering system 40 further includes a second movement mechanism having a base 50 configured to rotatably support the yoke 44 and to rotate the yoke and the primary mirror 36 about axis D to change yaw of the primary mirror 36. The second movement mechanism can rotate about axis D, sometimes referred to as the azimuth axis, with a frameless motor, for example. In the shown embodiment, axis D is generally perpendicular to Axis C. In another embodiment, a large gear provided within an opening large enough for the field of view to go through and driven by a gear assembly and/or a direct motor.

Still referring to FIG. 6, the optical steering system 40 further is configured to move the secondary mirror 38, which is shown in a stowed position. Specifically, the optical steering system 40 is configured to move the secondary mirror 38 into the optical path that is used to extend the field of regard and relocate an eyepoint of the optical assembly 30. In the shown embodiment, the secondary mirror 38 is mounted on the yoke 44 and is configured to be moved by the second movement mechanism from the stowed position to a deployed position. It should be noted that cameras, sensors, telescopes and the like may be positioned beneath the base 50 of the optical steering system through an opening 52 provided in the base to detect images reflected by the primary mirror 36 and the secondary mirror 38.

The yoke 44 further includes a connector element 54 provided on one side of the secondary mirror 38 and a stator 56 of a motor provided on an opposite side of the secondary mirror to rotate the secondary mirror about axis E, which is parallel to axis C of the primary mirror. A third movement mechanism is configured to rotate the secondary mirror 38 about axis E to change pitch of the secondary mirror.

Figure 7:
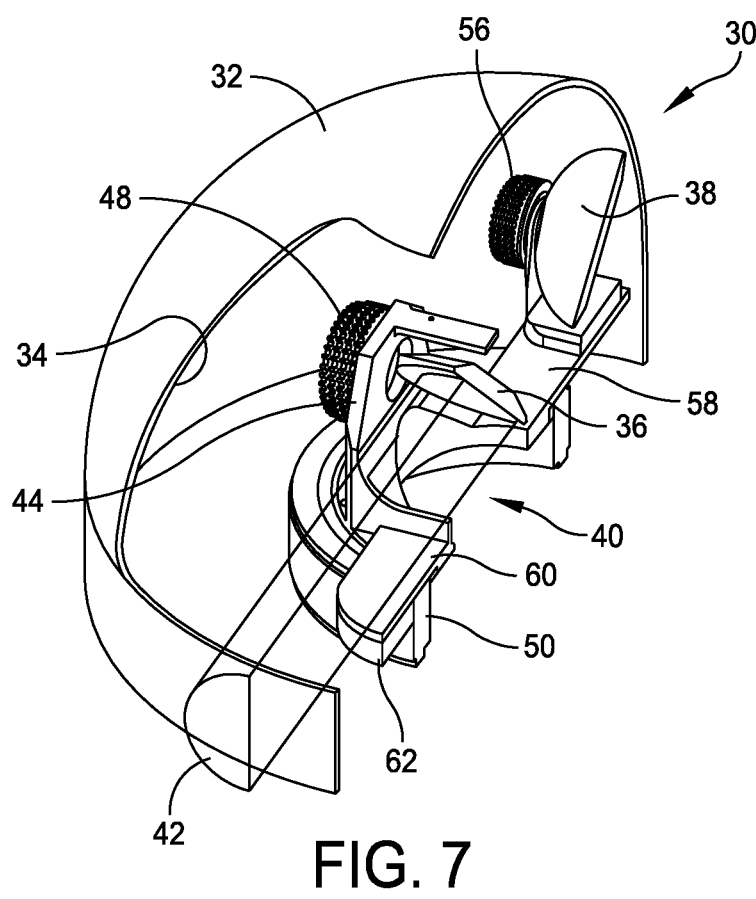
FIG. 7 is a cross-sectional perspective view of the optical steering system shown in FIG. 5.
Figure 8:
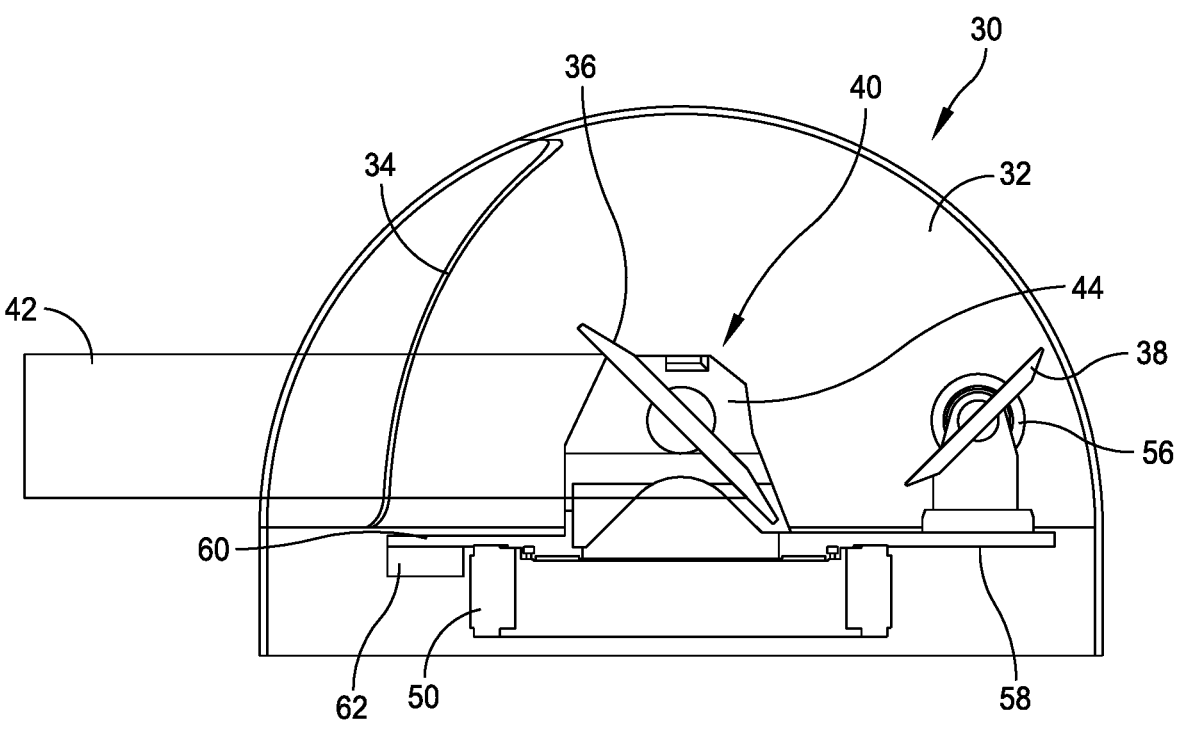
FIG. 8 is a side view of the optical steering system shown in FIG. 7.

Referring additionally to FIGS. 7 and 8, when the secondary mirror 38 is in the stowed position, the field of view 42 is configured to project through the window 34 of the turret 32 of the optical assembly 30 to the primary mirror 36. The secondary mirror 38 is removed from the optical path 42 toward the primary mirror 36 to maintain clearance for the field of view along the optical path. As shown, the secondary mirror 38 is mounted on a first extended portion 58 of the yoke 44, which in turn is rotatably mounted on the base 50. A second extended portion 60 including a counterweight 62 is provided, with the second extended portion extending in a direction opposite to a direction of the first extended portion 58. As its name implies, the counterweight 62 is provided to counterbalance the secondary mirror 38 when rotating the yoke 44 and the secondary mirror about axis D to the deployed position.

Figure 9:
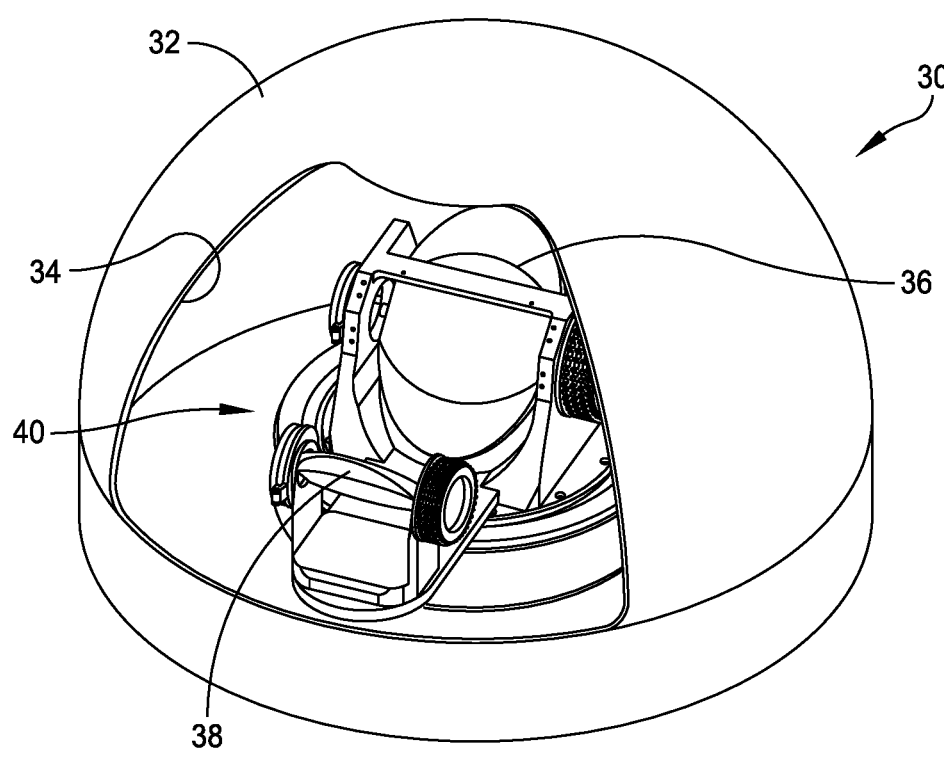
FIG. 9 is a perspective view of the optical assembly with the secondary mirror in a deployed position.
Figure 10:
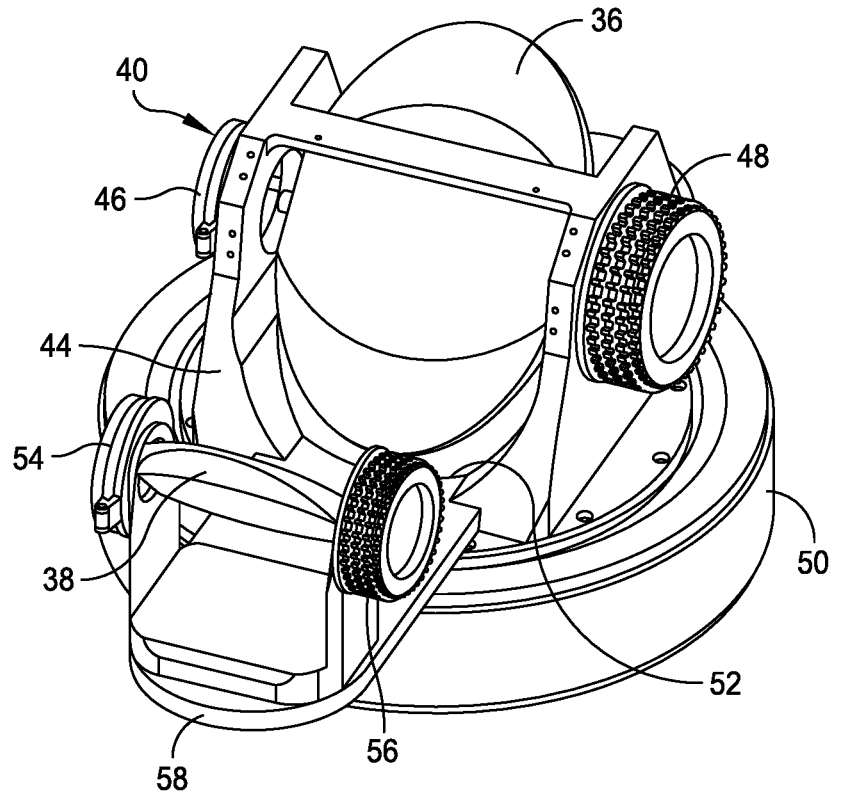
FIG. 10 is a perspective view of the optical assembly shown in FIG. 9 with the turret removed to show the operational components of the optical steering system.
Figure 11:
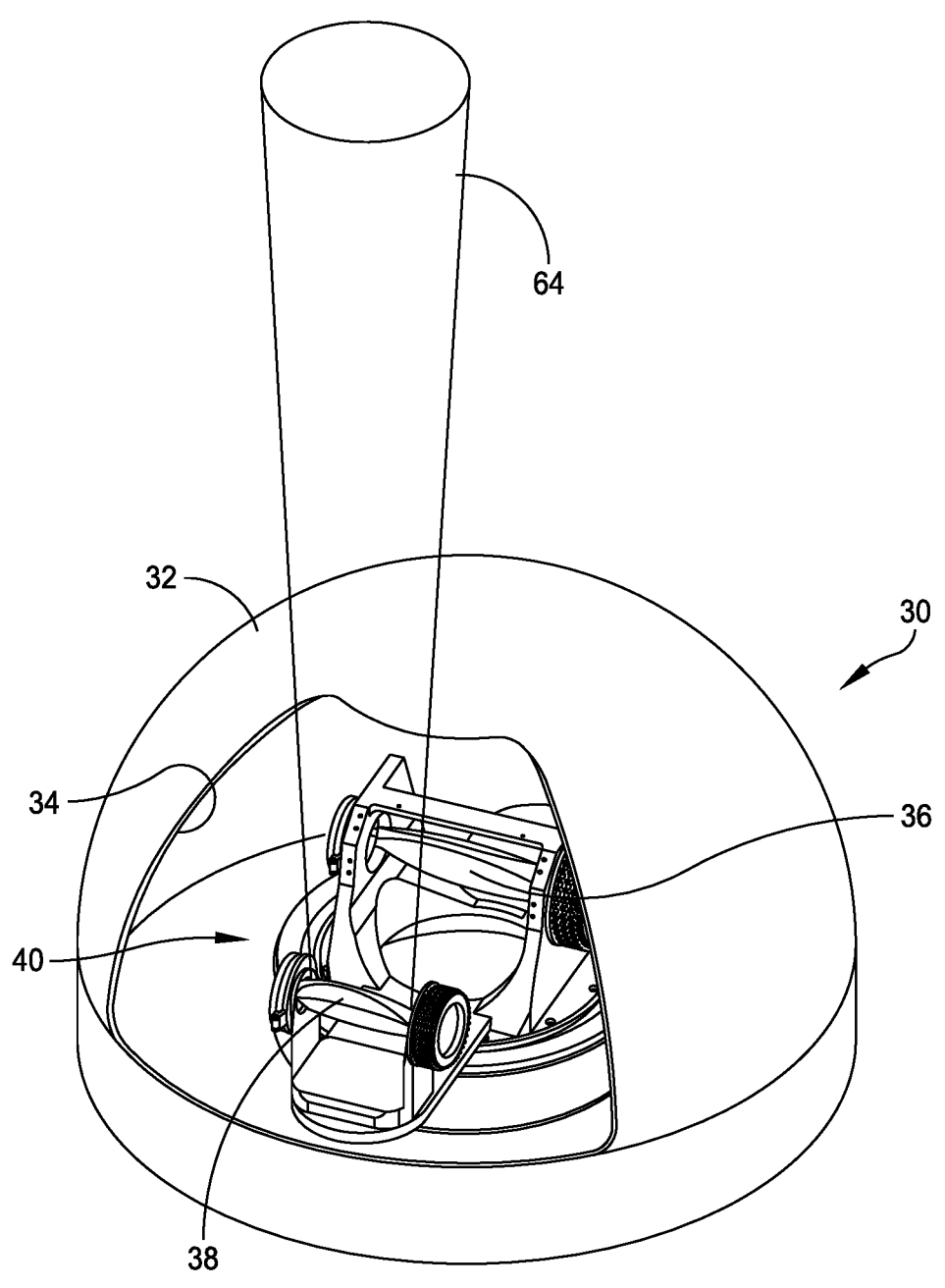
FIG. 11 is a perspective view of the optical assembly shown in FIG. 9 showing a field of view.
Figure 12:
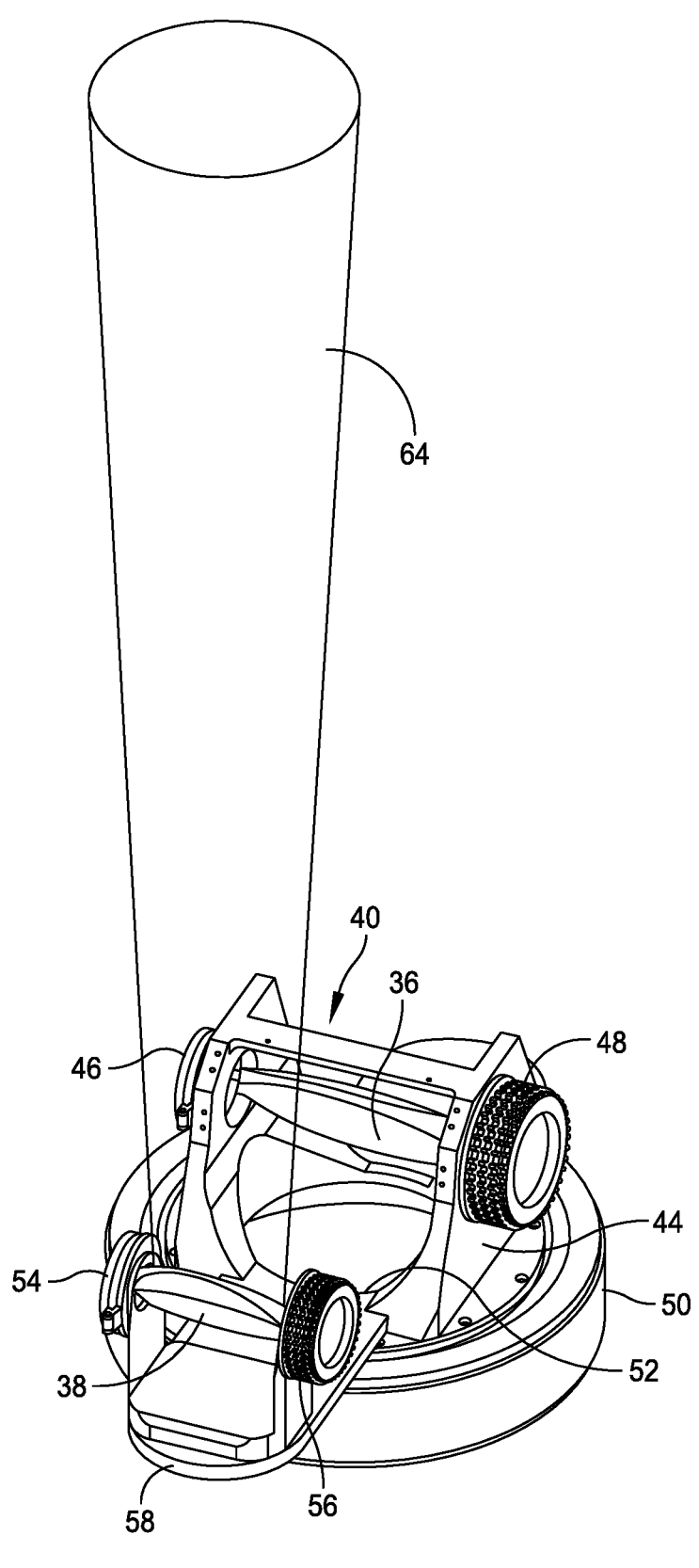
FIG. 12 is a perspective view of the optical assembly shown in FIG. 11 with the turret removed.

Referring to FIGS. 9 and 10, the secondary mirror 38 is illustrated in the deployed or operational position. In this position, the secondary mirror 38 provides a field of regard for the optical assembly 30 along the optical path 42. The yoke 44 is rotated 180° about the base 50 to position the secondary mirror 38 in front of the primary mirror 36. Further, the primary mirror 36 is rotated 90° to enable the secondary mirror 38 to receive the image and project the image in the field of regard. The secondary mirror 38 is positioned to direct the image to the primary mirror 36, which in turn is configured to direct the image to the sensor or detector. FIGS. 11 and 12 illustrate the secondary mirror 38 receiving the image along a field of regard 64, with FIG. 11 showing the image being received through the optical window 34 of the turret 32. The primary mirror 38 is shown rotated 90° to reflect the image to the sensor or detector positioned below the base 50.

Figure 13:
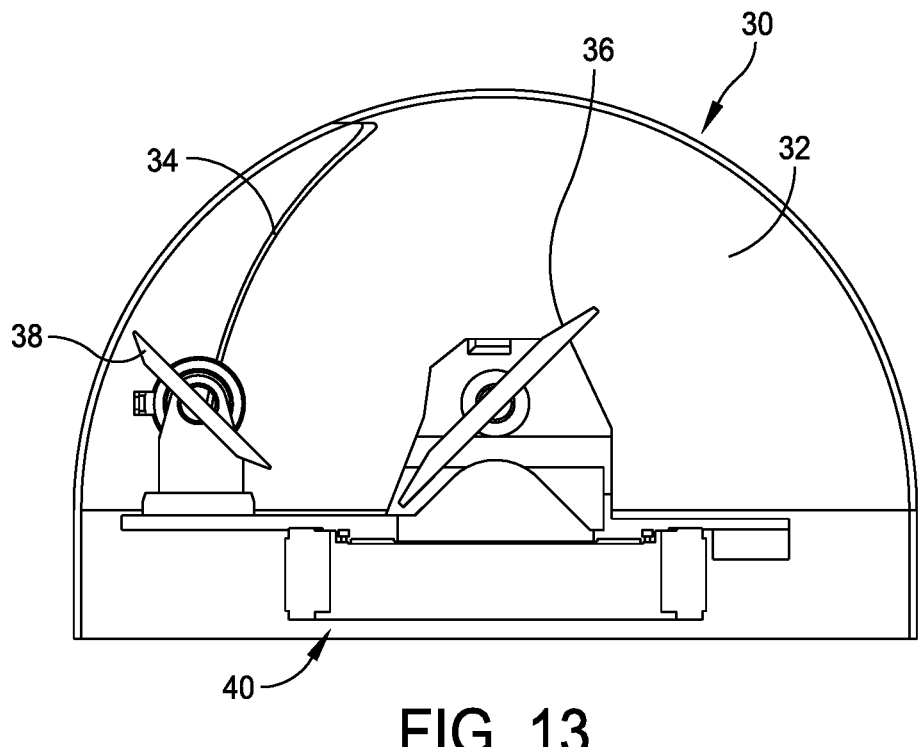
FIG. 13 is a cross-sectional side view of the optical assembly shown in FIG. 9.
Figure 14:
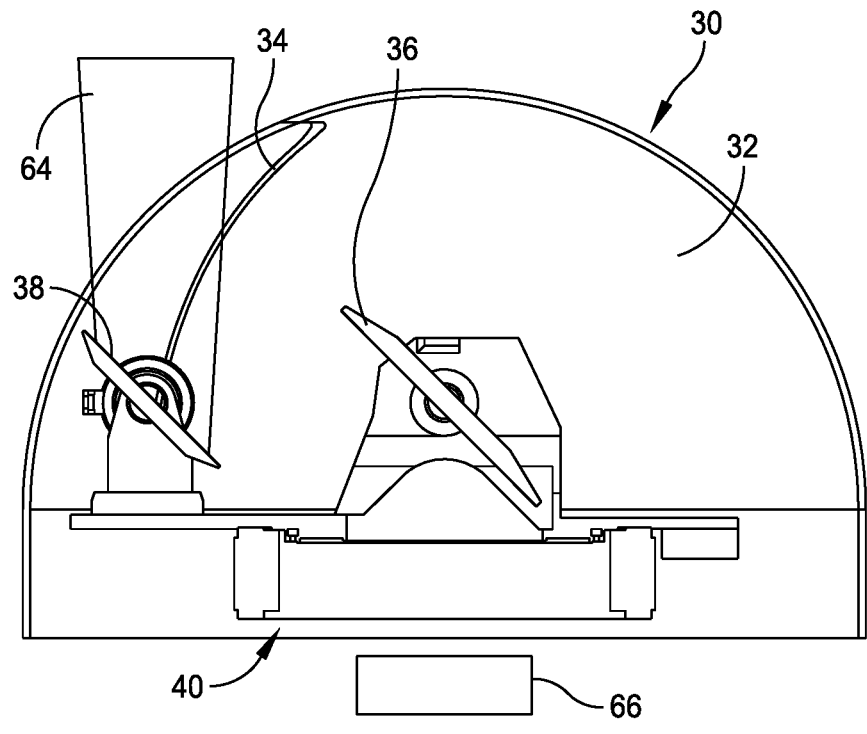
FIG. 14 is a cross-sectional side view of the optical steering system shown in FIG. 9 showing a field of regard.

Referring to FIGS. 13 and 14, the secondary mirror 38 is further shown in the deployed position. FIG. 13 shows the secondary mirror 38 moved to the deployed position with the primary mirror 36 prior to being rotated. FIG. 14 shows the primary mirror rotated 90° with the secondary mirror 38 receiving an image to reflect the image to the primary mirror 36 to a detector 66.

In operation, the secondary mirror 38 of the optical assembly 30 is moved from the stowed position in which the optical assembly is positioned to receive an image from a field of view to a deployed position in which the optical assembly is positioned to receive an image from a field of regard. To achieve this movement, the second movement mechanism is engaged to rotate the yoke 44 with respect to the base 50. Further, the primary mirror 36 is rotated 90° by the first movement mechanism, i.e., stator 48. A pitch of the secondary mirror 38 can be adjusted by the third movement mechanism, which is configured to rotate the secondary mirror.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An optical assembly comprising:
   a primary mirror;
   a secondary mirror; and
   an optical steering system configured to support and position the primary mirror and the secondary mirror, the optical steering system including:
   a base, and
   a yoke rotatably coupled to the base, the yoke being configured to support the primary mirror to rotate the primary mirror about a first axis and to support the secondary mirror to rotate the secondary mirror about a second axis, which is parallel to the first axis, the yoke further being configured to rotate the primary and secondary mirrors about a third axis, which is perpendicular to the first axis and the second axis,
   wherein the secondary mirror is configured to move from a stowed position in which the optical assembly is positioned to receive an image from a field of view to a deployed position in which the optical assembly is positioned to receive an image from a field of regard.

2. The optical assembly of claim 1, wherein the yoke includes a first movement mechanism configured to rotate the primary mirror about the first axis.

3. The optical assembly of claim 2, wherein the first movement mechanism includes a connector element provided on one side of the primary mirror and a motor provided on an opposite side of the primary mirror to rotate the primary mirror about the first axis.

4. The optical assembly of claim 2, wherein the yoke includes a second movement mechanism configured to rotate the yoke and the primary mirror about the second axis.

5. The optical assembly of claim 4, wherein the second movement mechanism includes a base configured to rotatably support the yoke and to rotate the yoke and the primary mirror about the second axis.

6. The optical assembly of claim 4, wherein the yoke further includes a third movement mechanism configured to rotate the secondary mirror about the third axis.

7. The optical assembly of claim 6, wherein the third movement mechanism includes a connector element provided on one side of the secondary mirror and a stator of a motor provided on an opposite side of the secondary mirror to rotate the secondary mirror about the third axis.

8. The optical assembly of claim 7, wherein the third axis is parallel to the first axis and the second axis is generally perpendicular to first axis and the third axis.

9. The optical assembly of claim 6, wherein the secondary mirror is mounted on a first extended portion of the yoke.

10. The optical assembly of claim 9, wherein the yoke includes a second extended portion having a counterweight, the second extended portion extending in a direction opposite to a direction of the first extended portion.

11. The optical assembly of claim 1, wherein a turret includes an optical window through which an optical path travels.

12. An optical steering system configured to support and position a primary mirror and a secondary mirror of an optical assembly, the optical steering system comprising:

a base; and a yoke rotatably coupled to the base, the yoke being configured to support the primary mirror to rotate the primary mirror about a first axis and to support the secondary mirror to rotate the secondary mirror about a second axis, which is parallel to the first axis, the yoke further being configured to rotate the primary and secondary mirrors about a third axis, which is perpendicular to the first axis and the second axis, wherein the secondary mirror is configured to move from a stowed position in which the optical assembly is positioned to receive an image from a field of view to a deployed position in which the optical assembly is positioned to receive an image from a field of regard.

13. The optical steering system of claim 12, wherein the yoke includes a first movement mechanism configured to rotate the primary mirror about the first axis.

14. The optical steering system of claim 13, wherein the first movement mechanism includes a connector element provided on one side of the primary mirror and a motor provided on an opposite side of the primary mirror to rotate the primary mirror about the first axis.

15. The optical steering system of claim 13, wherein the yoke includes a second movement mechanism configured to rotate the yoke and the primary mirror about the second axis.

16. The optical steering system of claim 15, wherein the second movement mechanism includes a base configured to rotatably support the yoke and to rotate the yoke and the primary mirror about the second axis.

17. The optical steering system of claim 15, wherein the yoke further includes a third movement mechanism configured to rotate the secondary mirror about the third axis.

18. The optical steering system of claim 17, wherein the third movement mechanism includes a connector element provided on one side of the secondary mirror and a stator of a motor provided on an opposite side of the secondary mirror to rotate the secondary mirror about the third axis.

19. The optical steering system of claim 17, wherein the secondary mirror is mounted on a first extended portion of the yoke.

20. A method of operating an optical assembly, comprising:

providing an optical steering system to support and position a primary mirror and a secondary mirror, the optical steering system including a base and a yoke rotatably coupled to the base, the yoke being configured to support the primary mirror to rotate the primary mirror about a first axis and to support the secondary mirror to rotate the secondary mirrors about a second axis parallel to the first axis, the yoke further being configured to rotate the primary and secondary mirror about a third axis, which is perpendicular to the first axis and the second axis; and operating the secondary mirror to move from a stowed position in which the optical assembly is positioned to receive an image from a field of view to a deployed position in which the optical assembly is positioned to receive an image from a field of regard.

\*   \*   \*   \*   \*